United States Patent [19]
Bowler et al.

[11] 3,718,376
[45] Feb. 27, 1973

[54] HYDRAULIC ANTI-LOCK BRAKE CONTROL SYSTEM

[75] Inventors: Lauren L. Bowler, Bloomfield Hills; John L. Harned, Grosse Pointe Woods, both of Mich.

[73] Assignee: General Motors Corporation, Detroit, Mich.

[22] Filed: Oct. 1, 1971

[21] Appl. No.: 185,512

[52] U.S. Cl............303/21 CG, 188/181 A, 303/21 F
[51] Int. Cl..................................................B60t 8/12
[58] Field of Search......303/21 F, 21 CG; 188/181 A

[56] References Cited

UNITED STATES PATENTS

| | | | |
|---|---|---|---|
| 3,529,872 | 9/1970 | Mitton | 303/21 CG |
| 3,635,531 | 1/1972 | Okamoto et al. | 303/21 CG |
| 3,671,084 | 6/1972 | Woodward | 303/21 F |

*Primary Examiner*—Allen N. Knowles
*Assistant Examiner*—Gene A. Church
*Attorney*—W. E. Finken et al.

[57] ABSTRACT

An all hydraulic anti-lock brake control system includes an operator actuated master cylinder fluidly connected to a wheel brake, a brake pressure modulator interposed fluidly intermediate the master cylinder and wheel brake, a transmission governor providing a fluid pressure proportional to the wheel speed, vehicle ground speed computer providing a fluid pressure proportional to the vehicle linear speed and valve means providing a control pressure for operation of the brake pressure modulator as a function of the difference existing between wheel speed pressure and vehicle ground speed pressure. In the first embodiment of the invention a servo control valve varies the control pressure as a function of the difference between the wheel speed pressure and the vehicle ground speed pressure so as to maintain a substantially constant wheel slip at a high value of wheel-to-road friction coefficient. The second and third embodiments vary the control pressure so as to continuously seek out the peak value of wheel-to-road friction coefficient and thereby maintain a high average coefficient. The second embodiment includes a hysteresis switching valve in combination with the servo control valve while the third embodiment employs a hysteresis switching valve.

4 Claims, 7 Drawing Figures

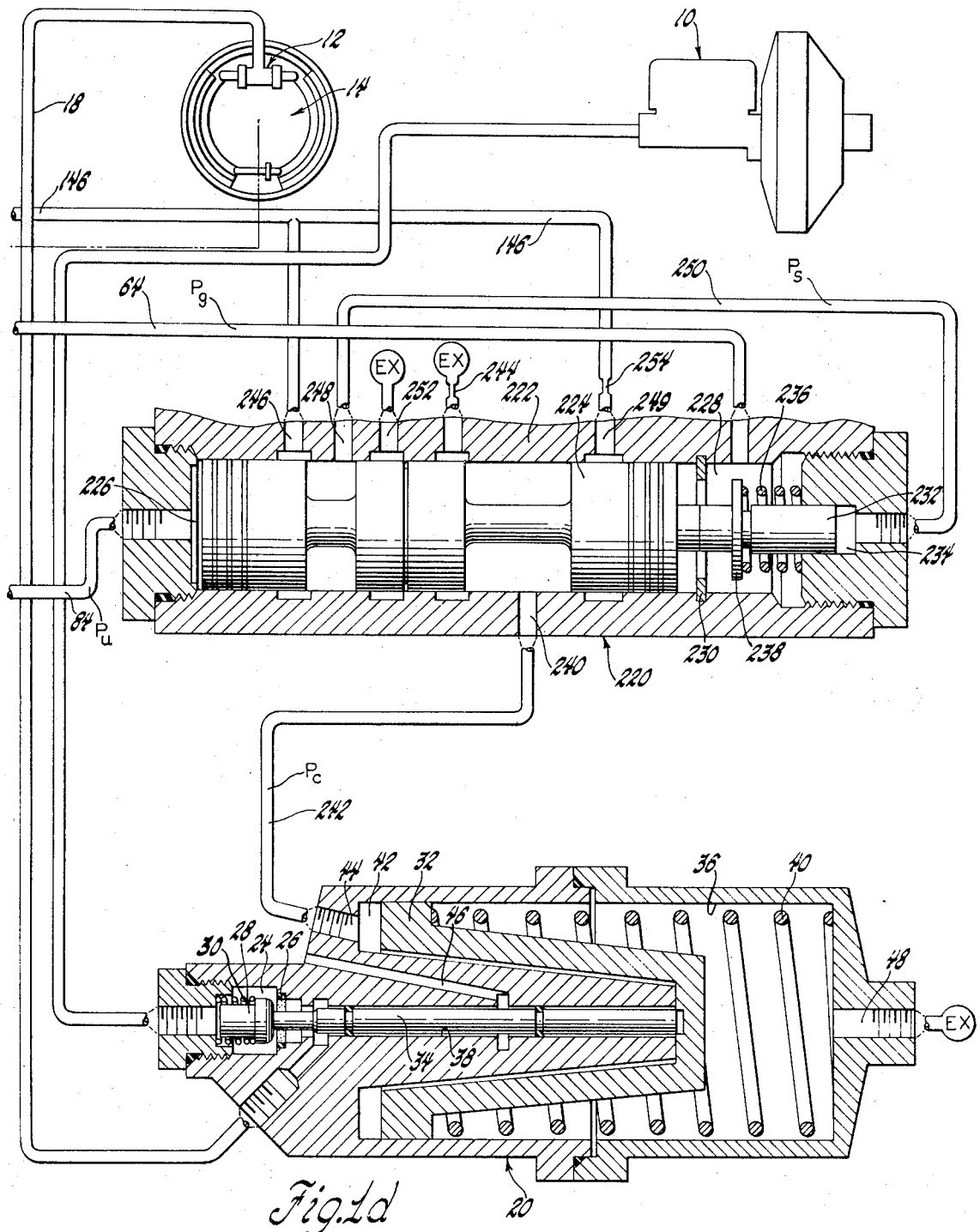

HYDRAULIC ANTI-LOCK BRAKE CONTROL SYSTEM

CROSS REFERENCE TO RELATED APPLICATION

The hydraulic anti-lock brake control system of this invention is used in conjunction with the hydraulic vehicle ground speed computer claimed in our copending patent application Ser. No. 185,086 filed Sept. 30, 1971.

BACKGROUND OF THE INVENTION

The invention relates to an improved anti-lock brake control system and more particularly to an all-hydraulic wheel condition sensing and control logic circuit which operates a conventional brake pressure modulator to control wheel slip.

It is well known that the friction coefficient between a vehicle tire and the road surface decreases rapidly when the brake torque generated by an excessive brake pedal actuation causes the vehicle wheel to depart from the free-rolling condition and approach the locked wheel condition in which the wheel slides on the road surface. Such a decrease in friction coefficient as excessive braking causes an increase in wheel slip may be evidenced by impaired vehicle directional stability. It is, therefore, advantageous to limit the decrease in the wheel-to-road coefficient by controlling the brake pressure so as to maintain the wheel slip within acceptable limits.

SUMMARY OF THE INVENTION

The vehicle brake system includes a conventional master cylinder fluidly connected by a conduit to a wheel brake or brakes. A conventional brake pressure modulator, well known in the art, is interposed in the conduit connecting the master cylinder and the wheel brake or brakes to be controlled. A wheel speed proportional pressure is generated by the transmission governor and a pressure proportional to the vehicle speed relative to ground is provided by a vehicle ground speed computer.

The first embodiment of the invention utilizes a servo control valve which provides a control pressure for operation of the brake pressure modulator as a function of the difference existing between the wheel speed pressure and the vehicle ground speed pressure so as to maintain a substantially constant wheel slip at a high value of wheel-to-road friction coefficient. The second and third embodiments of the invention operate on the extremal control principle and utilize switching valve means which compare wheel speed pressure with vehicle speed pressure and function to provide a control pressure for operation of the modulator so as to continuously seek out the peak value of wheel-to-road friction coefficient.

BRIEF DESCRIPTION OF THE DRAWINGS

Figure 1A:
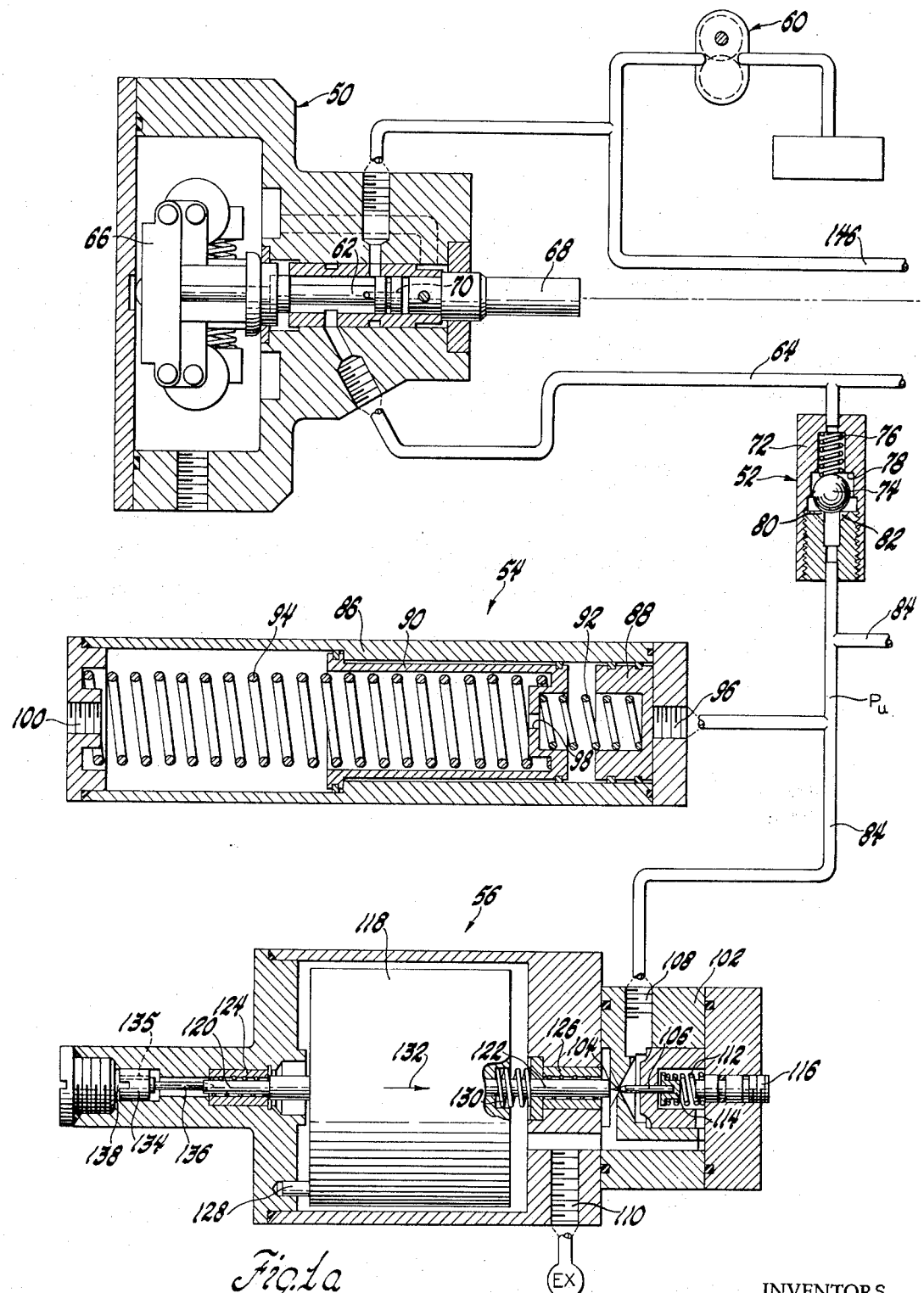
FIG. 1a illustrates the transmission governor and the hydraulic vehicle ground speed computer having parts broken away and in section.
Figure 1B:
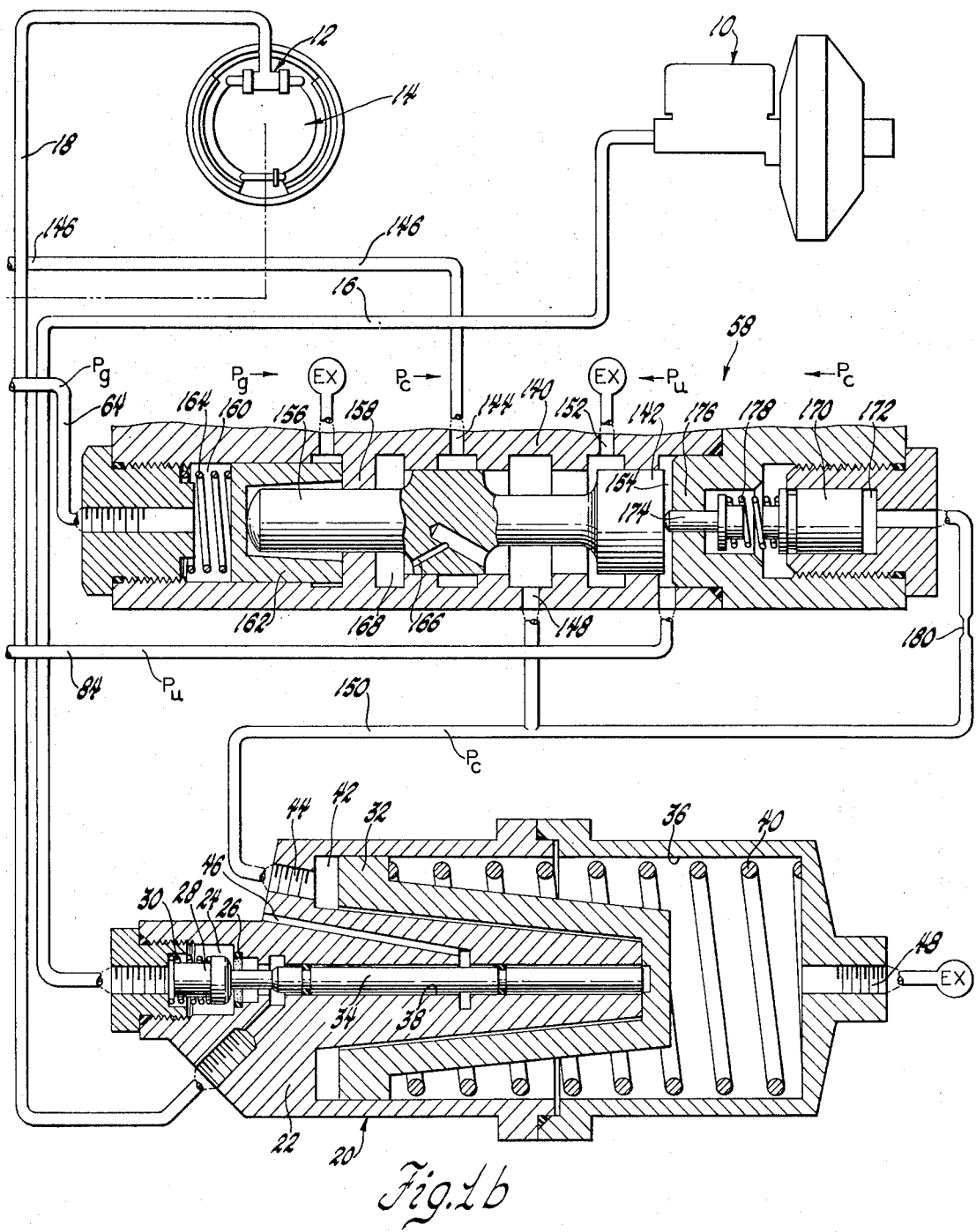
FIG. 1b illustrates the first embodiment of the hydraulic anti-lock brake control system having parts broken away and in section.

In the drawings:

FIG. 1d illustrates the third embodiment of the anti-lock brake control system having parts broken away and in section;

The Embodiment of FIG. 1b

Referring to FIG. 1b, it can be seen that the brake system includes a conventional operator-actuated power-boosted master cylinder 10 which generates a master cylinder pressure and a conventional wheel brake 12 which imparts a braking torque to the wheel 14 in proportion to the brake pressure acting thereon. The master cylinder 10 and wheel brake or brakes 12 are connected by conduits 16 and 18. A conventional brake pressure modulator 20 is interposed at the juncture of conduits 16 and 18.

The brake pressure modulator 20 includes a housing 22 in which a valve chamber 24 is formed. A check valve assembly including a valve member 28 which is urged by a spring 30 into sealing engagement of a valve seat 26 on a housing 22 blocks flow through the valve chamber 24 from the master cylinder 10 to the wheel brake 12 when seated. Pistons 32 and 34 are respectively slidable in bores 36 and 38 provided in the housing 22. A spring 40 seated at housing 22 urges piston 32 to a rest position wherein it engages the housing 22. Piston 34 engages piston 32 and extends into valve chamber 24, forming a movable wall thereof. The piston 34 is of sufficient length to engage the valve member 28 and hold it unseated from valve seat 26 when the piston 32 is at its rest position. The spring 40 is preloaded to resist movement of pistons 32 and 34 by the highest expected value of brake pressure in valve chamber 24 acting on the end area of piston 34. Thus the valve member 28 is normally held unseated to permit free fluid communication between the master cylinder 10 and wheel brake 12.

The piston 32 forms with housing 22 a pressure chamber 42 which is pressurizable through inlet port 44 to move piston 32 against the force of spring 40. When the pressure chamber 42 is so pressurized, piston 32 is moved rightwardly permitting the master cylinder pressure in valve chamber 24 to move piston 34 rightwardly to sequentially allow seating of valve member 28 by spring 30 and relieve the brake pressure in conduit 18. Thus, once valve member 28 has been seated, the magnitude of the brake pressure communicated to wheel brake 12 is inversely proportional to the pressure in chamber 42. It is noted that fluid leakage past the seals of piston 34 is vented through passage 46 and any leakage past piston 32 is relieved at exhaust port 48.

An all-hydraulic wheel condition sensing and control logic circuit provides a control pressure, hereinafter referred to as $P_c$, which is communicated to the pressure chamber 42. Referring to the composite of FIGS. 1a and 1b, the circuit includes generally a transmission governor 50 which provides a fluid pressure proportional to the wheel speed; a vehicle ground speed computer including a check valve 52, an accumulator 54, and a decelerometer actuated valve 56 which cooperate to provide a fluid pressure proportional to the vehicle speed relative to ground; and a servo control valve 58 which provides a regulated control pressure $P_c$ as a function of the difference between the wheel speed pressure, hereinafter referred to as $P_g$, and the vehicle ground speed reference pressure, hereinafter referred to as $P_u$.

The transmission governor 50 includes a valve spool 62 which communicates pressure from the transmission pump 60 to $P_g$ conduit 64 in proportion to the unbalance forces acting thereon. A flyball weight assembly 66 is driven by an input shaft 68 suitably connected to the wheel 14 and generates a force acting rightwardly on the valve spool in proportion to the square of the wheel velocity. An orifice 70 in the valve spool communicates $P_g$ to the right end of the valve spool 62 providing a leftward acting pressure force which opposes the flyball generated force. Thus, the governor continually responds to keep the valve spool 62 in equilibrium, producing a $P_g$ proportional to the square of the governor's angular speed. The flyball weight assembly 66 includes primary and secondary weights which function to provide a two-stage pressure versus speed characteristic.

Check valve 52 of the ground speed computer includes a housing 72 in which a ball valve 74 is located. A spring 76 seated at housing 72 engages ball valve 74 urging it away from a seat 78 and into engagement with abutment 80. Fluid passages 82 communicate fluid past ball valve 74 when it is seated at abutment 80 so that the conduits 64 and 84 are connected. When the speed of the wheel 14 decreases and consequently $P_g$ decreases, the resulting flow from conduit 84 to conduit 64 will overcome spring 76 and seat ball valve 74 at valve seat 78. Spring 76 is sized to be compressed when the flow rate is such as to indicate a certain predetermined rate of wheel deceleration, for example 32.2 feet per second squared or $1_g$.

Accumulator 54 includes a housing 86 in which pistons 88 and 90 are slidable. A variable rate spring 92, of helical variable pitch design, acts between pistons 88 and 90 and a second variable rate spring 94, also of helical variable pitch design, acts between piston 90 and housing 86. Springs 92 and 94 function to provide a two-stage construction which produces a nonlinear relationship between the position of piston 88 and the accumulator pressure so that a pressure versus speed curve equivalent to that of the governor 50 is generated. Spring 94 is preloaded and spring 92 at free length when the respective pistons are positioned as shown in FIG. 1a. Communication of $P_g$ through conduit 84 to inlet port 96 of accumulator 54 first moves piston 88 leftwardly compressing variable rate spring 92 until piston 88 engages piston 74. A further increase in $P_g$ urges pistons 88 and 90 unitarily leftward compressing the variable rate spring 94. Any fluid leakage past the seals of piston 88 is exhausted through hole 98 and exhaust port 100.

The decelerometer actuated valve 56 functions to exhaust pressure from accumulator 54 at a controlled rate which is proportional to the vehicle linear deceleration. A housing 102 forms a sharp-edged hole 104 which in cooperation with a tapered needle 106 produces a flow restriction between an exhaust port 110 and a a valve inlet port 108 which is connected to conduit 84. Tapered needle 106 is urged in the flow restricting direction relative to the sharp-edged hole 104 by a spring 112 which engages the tapered needle 106 through the intermediary of cap 114. The preload of spring 112 is adjustable by virtue of its being seated on a pin 116 which threadedly engages housing 102. A sensor mass 118 includes pins 120 and 122 which are respectively supported on ball bushings 124 and 126. A pin 128 attached to the sensor weight 118 engages a hole in housing 102 to prevent rotation of the sensor mass 118. The pins 120 and 122 are aligned with the vehicle longitudinal axis and the ball bushings 124 and 126 allow the sensor mass to move in this single degree of freedom. The end of pin 122 engages the tapered end of the tapered needle 106 so that movement of sensor mass 118 adjusts the position of tapered needle 106 and thus the flow through the sharp-edged hole 104. A spring 130 acting between housing 102 and sensor mass 118 resists movement of sensor mass 118 in the direction of arrow 132 which indicates the direction of forward vehicle movement. A piston 134 having an orifice 135 is attached to pin 120 by a rod 136 and operates in a closed chamber 138 to provide damping of sensor mass 118 which prevents undesired oscillations. The flow area between needle 106 and the sharp-edged hole 104 varies nearly linearly with the inertia force acting upon sensor mass 118. It is noted that selection and adjustment of springs 112 and 130 can be made to provide a $P_u$ which changes at a rate equal to, less than, or greater than the corresponding change in vehicle ground speed.

In operation, the pressure $P_u$ in the accumulator 54 is equal to $P_g$ when the vehicle wheels are either decelerating at normal rates or accelerating. When the pressure difference across check valve 52 is indicative of a wheel deceleration in excess of $1_g$ or some other predetermined level, conduit 84 is isolated from conduit 64. Pressure in accumulator 54, $P_u$, is exhausted at a controlled rate proportional to the vehicle linear deceleration through the deceleration actuated valve 56. The springs 92 and 94 of accumulator 54 function to provide a pressure versus speed characteristic equivalent to that of the governor 50. Thus the cooperation of check valve 52, accumulator 54, and the decelerometer actuated valve 56 provides a pressure $P_u$ in conduit 84 which is proportional to the vehicle ground speed.

The servo control valve 58 provides a regulated control pressure $P_c$ as a function of the difference existing between $P_g$ and $P_u$ and includes a housing 140 in which a valve spool 142 is slideable. Inlet port 144 in housing 140 receives transmission pressure through conduit 146. Housing 140 also includes an exhaust port 152 and a $P_c$ outlet port 148 which is connected to pressure chamber 42 of the modulator 20 by a conduit 150. Valve spool 142 is slidable in the housing 140 to connect the $P_c$ outlet port 148 with either the inlet port 144 or the exhaust port 152. $P_u$ in conduit 84 is communicated to chamber 154 at the rightward end of valve spool 142 causing a leftward acting pressure force on valve spool 142. An extension 156 of valve spool 142 extends through wall 158 of housing 140 into a chamber 160 formed by the housing. A piston 162 is slidable in the housing and is urged by a spring 164 into engagement with wall 158 and extension 156, thereby defining the rest position of spool 142 as shown in FIG. 1b wherein $P_c$ outlet port 148 is connected to the exhaust port 152 so that $P_c$ equals zero. $P_g$ in conduit 64 is communicated to the chamber 160 where it acts on piston 162 to provide a rightward acting force on valve spool 142. The end area of piston 162 in chamber 160 is larger than the opposing end area of valve spool 142 in chamber 154. Thus, when $P_g$ equals $P_u$ as is the case during nonbraking or normal braking, the differential pressure force acting on valve spool 142 maintains communication of $P_c$ outlet port 148 to the exhaust port 152.

When the driver exerts excessive pedal force, the wheel 14 decelerates rapidly toward lock-up and $P_g$ falls below $P_u$ as hereinbefore described. When the pressure differential between $P_g$ and $P_u$ generates a net force on valve spool 142 exceeding the preload force of spring 164, the valve spool 142 begins to move leftwardly from the rest position of FIG. 1b. This leftward movement of valve spool 142 connects $P_c$ outlet port 148 with the inlet port 144 causing the control pressure to begin increasing from zero. An orifice 166 in valve spool 142 communicates $P_c$ to chamber 168 producing a spool reaction force proportional to $P_c$ and urging spool 142 rightwardly to close off the inlet port 144. The resulting servo control action provides a $P_c$ proportional to the pressure differential between $P_u$ and $P_g$. The control pressure increases in proportion to the magnitude of wheel slip and rapidly reaches a level sufficient to overcome spring 40 of modulator 20 and override the vehicle operator's control of the wheel brake 14.

Figure 2:
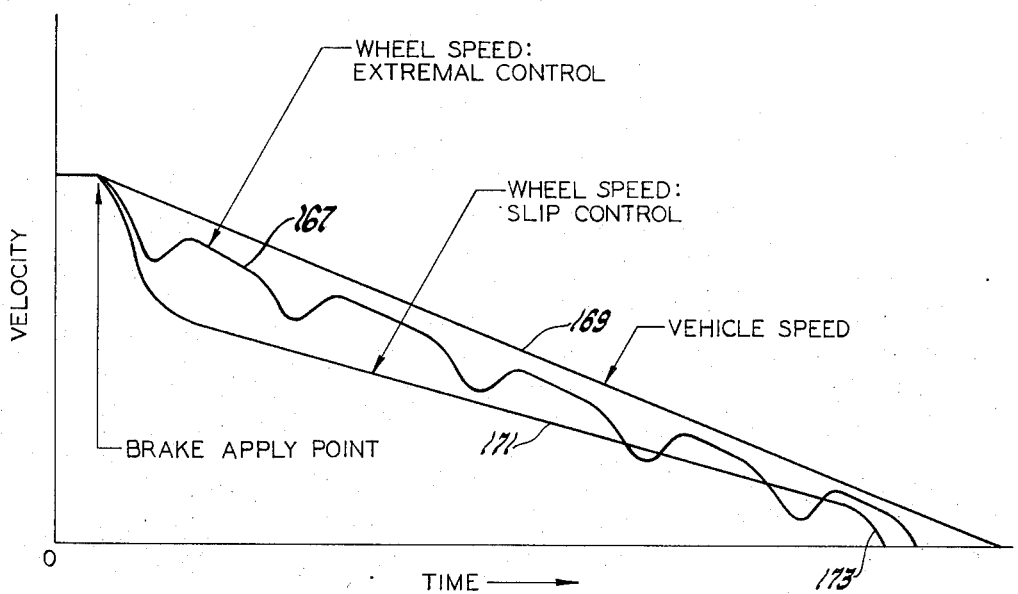
FIG. 2 is a plot of velocity against time.

The control action of the hydraulic circuit is to force the wheel 14 to operate during anti-lock operation at that wheel slip which provides a maximum wheel to road friction coefficient. The slip control point or more particularly the ratio of wheel speed to vehicle speed is determined by the ratio of the end area of spool 142 in chamber 154 to the end area of piston 142 in chamber 160. The ratio of these end area establishes a system equilibrium condition at which the brake torque developed by the brake pressure exceeds the tire torque permitted by the road condition. If wheel speed decreases below this equilibrium point, $P_g$ is decreased and the servo control valve 58 reacts by increasing $P_c$ whereby the brake pressure is reduced and the brake torque decreased below tire torque to permit wheel acceleration. If on the other hand wheel speed increases above the equilibrium point, $P_g$ increases and servo control valve 58 reacts by decreasing $P_c$ whereby the brake pressure is increased and the wheel caused to decelerate. The decelerometer actuated valve 56 is adjusted so that $P_u$ is decreased at a rate equal to the vehicle speed decrease so that $P_u$ decreases in step with the vehicle speed decrease forcing the wheel speed to decrease in synchronism. Referring to the velocity versus time curves of FIG. 2, the vehicle speed curve 169 shows the vehicle slowing down when the brakes are applied. The wheel speed curve 171 shows the effect of the hydraulic circuit in providing a constant ratio between the vehicle and wheel speeds during anti-lock operation.

The preload force of spring 164 also effects the slip control point but in actuality has little effect except at low vehicle speeds. Since the spring 164 preload causes $P_g$ to be less than $P_u$, the wheel speed is forced to zero before the vehicle speed reaches zero. Thus, as the vehicle approaches a full stop, $P_c$ is decreased to allow unseating of valve member 28 and consequently before the vehicle stops the full brake pressure is applied to the wheel brake 12 permitting the wheel 14 to lock up as shown by the portion of the FIG. 2 wheel speed curve 171 designated 173. It is noted that without spring 164 in servo control valve 58, there is a tendency for brake torque to fall below tire torque as the vehicle decelerates through the low speed portion of the brake stop.

Figure 3:
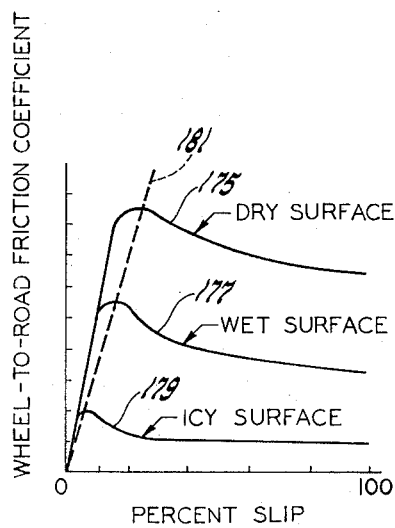
FIG. 3 is a plot of wheel-to-road friction coefficient against percent wheel slip.

Servo control valve 58 provides for adaptive feedback to compensate for operation of the system over a wide range of road surface friction coefficients. The necessity for adaptive feedback is best understood by reference to FIG. 3, a plot of wheel-to-road friction coefficient versus percent wheel slip. Curve 175 shows the relationship for a dry paved road, curve 177 for a wet road, and 179 for an ice covered road. Dashed line 181 is drawn through the peak of each curve and represents a plot of the percent slip at which the maximum wheel-to-road friction will be attained. Referring again to FIG. 1b, the adaptive feedback system includes a piston 170 which is sealingly slidable in the housing 140 and forms therewith a chamber 172. A pin 174 extends through wall 176 of housing 140 and into chamber 154 where it engages the end of valve spool 142. A spring 178 acts between pin 174 and piston 170. $P_c$ is communicated to the chamber 172 through an orifice 180 and generates a pressure force on spool 142 through piston 170, spring 178 and pin 174. This adaptive force aids the differential pressure force generated by $P_g$ and $P_u$. It is noted the $P_c$ generated during antilock operation on a high friction coefficient road surface is relatively low since such a surface is capable of supporting a relatively high brake pressure. On the other hand, low friction coefficient road surfaces such as ice result in a relatively large $P_c$ since the tire torque is not capable of sustaining a large brake torque. Since $P_c$ is low on high friction coefficient road surfaces, the adaptive force on spool 142 is low and has little effect. On low friction coefficient road surfaces, the $P_c$ is large and the resulting adaptive force modifies the equilibrium point of the system to maintain $P_g$ closer to $P_u$, thus effecting a reduction of the wheel slip. Thus, within practical limits, the system adapts to road surface condition by varying the slip control point to attain the maximum wheel-to-road friction coefficient. The orifice 180 and the accumulator formed by piston 170 and spring 178 filter the control pressure before applying it as a feedback force so as to eliminate undesired dynamic effects.

Figure 1C:
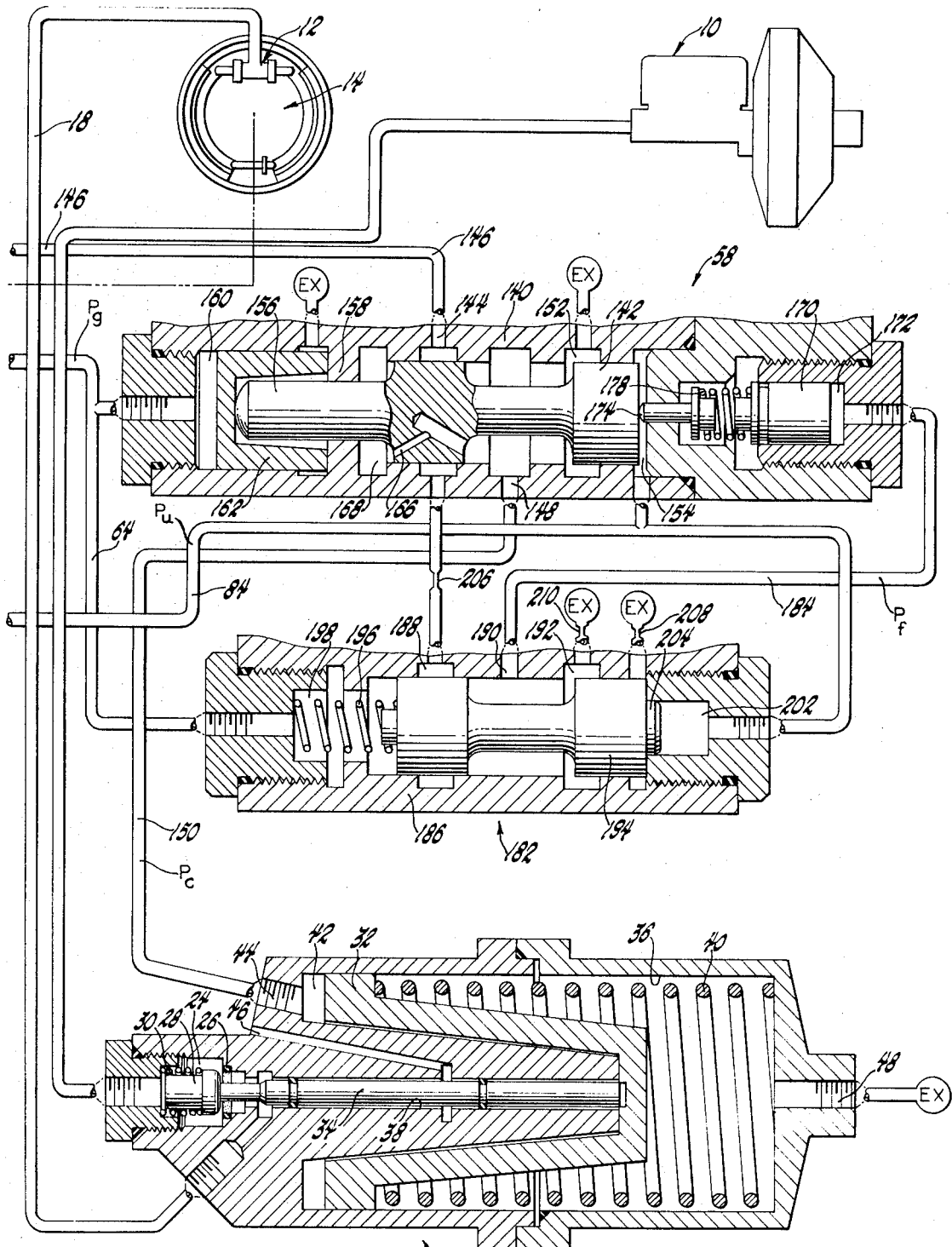
FIG. 1c illustrates the second embodiment of the anti-lock brake control system having parts broken away and in section.

The Embodiment of FIG. 1c

Referring now to the embodiment of the invention shown in FIG. 1c, a peak seeking type control system based on the extremal control principle is shown. It will be noted that the master cylinder 10, wheel brake 12, wheel 14, modulator 20 and servo control valve 58 are identical to the corresponding components of the embodiment of FIG. 1b, and are therefore assigned identical reference numerals.

A hysteresis switching valve 182 produces a feedback pressure, hereinafter referred to as $P_f$, which is communicated through conduit 184 to chamber 172 where it acts on spool 142 through piston 170, spring 178 and pin 174. The hysteresis switching valve 182 includes a housing 186 having an inlet port 188 connected to conduit 146, a $P_f$ outlet port 190 connected to conduit 184, and an exhaust port 192. Valve spool 194 is slidable in the housing 186 to selectively connect the $P_f$ outlet port 190 with either the inlet port 188 or exhaust port 192. A spring 196 engages the left end of valve spool 194 urging it to the rest position shown in FIG. 1c wherein $P_f$ outlet port 190 is communicated to the exhaust port 192 so that $P_f$ equals zero. $P_g$ in conduit 64 is received from the transmission governor 50 of FIG. 1a and communicates with chamber 198 at the leftward end of valve spool 194. $P_u$ in conduit 84 is received from the ground speed computer of FIG. 1a and is communicated to chamber 202 at the rightward end of valve spool 194. The rightward end of spool 194 is stepped to provide an extension 204, the outer periphery of which is sealingly received in housing 186 when the spool 194 is in its rest position. Thus, when the spool 194 is in its rest position, the end area of spool 194 presented to $P_u$ in chamber 202 is considerably less than the end area of spool 194 presented to $P_g$ in chamber 198.

Figure 4:
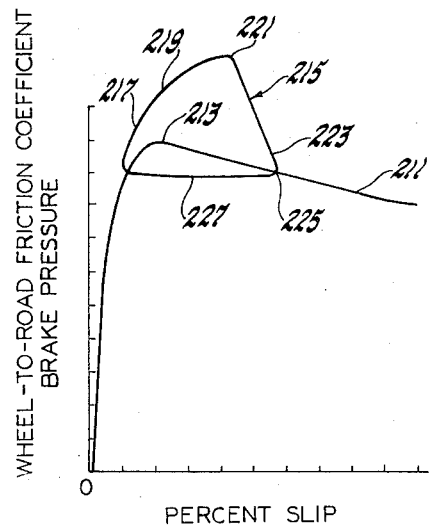
FIG. 4 is a plot of wheel-to-road friction coefficient and brake pressure against percent wheel slip.

During the following explanation of the operation of the embodiment of FIG. 1c, reference will be made to the plot of wheel-to-road friction coefficient and brake pressure against percent slip shown in FIG. 4. Referring to FIG. 4, curve 211 represents the wheel-to-road friction coefficient available at various wheel slip percentages. It can be seen that the maximum coefficient and thus the maximum braking effectiveness is obtained at point 213, the peak of curve 211. The closed loop 215 plots the brake pressure provided by the hydraulic circuit against percent slip.

When $F_g$ equals $P_u$ as it does during nonbraking and normal braking the net pressure force acts on piston 194 holding it at the rest position while at the same time holding the piston 142 of the servo control valve 58 at its rest position wherein $P_c$ is at zero. When the driver applies excessive pedal force, the wheel speed decreases below the vehicle speed. As brake pressure is applied in accordance with portion 217 of curve 215, it can be seen that wheel slip and friction coefficient increase until brake pressure reaches point 219. Then, as further brake pressure is applied, the wheel slip continues to increase past point 213 with a decrease in friction coefficient. At a preselected pressure differential between $P_u$ and $P_g$, or in other words, at a predetermined wheel slip, the valve spools 142 and 194 are moved towards the left. The threshold value of $P_u$ minus $P_g$ for the servo control valve 58 and hysteresis switching valve 182 may be the same, higher or lower, depending on how the hydraulic circuit is tuned to suit the requirements of a particular vehicle and particular road operating conditions. Once the pressure differential between $P_u$ and $P_g$ exceeds the threshold of servo control valve 58, the hydraulic circuit composed of the servo control valve 58 and modulator 20 operate as previously described except for the effect of the hysteresis switching valve 182. When the pressure differential between $P_u$ and $P_g$ exceeds the threshold of hysteresis switching valve 182 causing spool 194 to move leftwardly, the extension 204 of spool 194 is withdrawn from sealing engagement with housing 186 and the total end area of valve spool 194 is exposed to $P_u$ in chamber 202. The pressure forces on spool 194 are thus abruptly unbalanced causing spool 194 to snap over to the extreme leftward position thereof. $P_f$ outlet port 190 is thus communicated to inlet port 188 causing $P_f$ to increase from zero at a rate determined by an orifice 206 at the inlet port 188 and the accumulator composed of piston 170 and spring 178 in servo control valve 58. $P_f$ acts through spring 178 to produce a leftward acting force on spool 142. At a wheel slip corresponding to point 221 of curve 215, the $P_f$ force acting on the spool 142 causes $P_c$ to increase and act through modulator 20 to reduce brake pressure along portion 223 of curve 215. When portion 223 of curve 215 intersects curve 211 at point 225, the tire torque equals the brake torque, generated by the brake pressure and the wheel speed increases along portion 227 of curve 215 with a consequent reduction of wheel slip and increase of $P_g$.

During the time that $P_f$ is increasing, $P_u$ is decreasing at a rate controlled by the decelerometer actuated valve 56. By changing the adjustment of the accelerometer actuated valve 56, the rate of decrease of $P_u$ is made slightly higher than the corresponding vehicle deceleration so that $P_u$ falls slightly below the equivalent vehicle ground speed during the time that $P_f$ is increasing. An exhaust orifice 208 in housing 186 communicates with $P_u$ chamber 202 when spool 194 is in the leftward position and consequently also contributes to a $P_u$ pressure decrease in excess of the vehicle speed decrease.

When the increasing $P_g$ equals the decreasing $P_u$, valve spool 194 is pressure balanced and the spring 196 starts to move the spool 194 rightwardly. Rightward movement of spool 194 progressively connects $P_f$ outlet port 190 with exhaust port 192. An exhaust orifice 210 at exhaust port 192 cooperates with the accumulator formed by piston 170 and spring 178 to control the decrease rate of $P_f$. The wheel speed continues to increase along portion 227 of curve 215 during the interval that spool 194 is switching over to its rightward position. When valve spool 194 reaches its extreme rightward position and $P_f$ is exhausted, spool 142 acts to decrease $P_c$ and thereby increase brake pressure along portion 217 of curve 215. It is noted that the wheel speed approaches very close to the vehicle speed before it again starts to decrease due to the decreasing $P_f$, thereby allowing the vehicle ground speed computer to be reset to a pressure close to the corresponding vehicle ground speed before wheel deceleration again becomes excessive and $P_g$ decreases below $P_u$ to exceed the threshold of hysteresis switching valve 182.

Thus, it can be seen that the normal operation of the antilock control is to oscillate in a stable limit cycle mode, periodically cycling $P_f$ from an increasing rate to a decreasing rate to cause the antilock control to continuously seek out the peak value 213 of curve 211. The effect of such a control sequence on the wheel speed is shown by curve 167 of FIG. 2. The wheel speed is cyclically increased and decreased to maintain a high average friction coefficient.

The Embodiment of FIG. 1d

Referring to FIG. 1d, the third embodiment of the invention is shown. Those elements of FIG. 1d which are identical to those of FIGS. 1b and 1c are assigned identical reference numerals. A hysteresis switching valve 220 provides a control pressure $P_c$ for the operation of modulator 20 as a function of the difference existing between $P_g$ and $P_u$ which are respectively received from the transmission governor 58 and the vehicle ground speed computer of FIG. 1a.

Hysteresis switching valve 220 includes a housing 222 in which a valve spool 224 is slidable. The vehicle ground speed reference pressure $P_u$ in conduit 84 is received at chamber 226 at the leftward end of spool 224. The wheel speed pressure $P_g$ in conduit 64 is received in chamber 228 at the rightward end of valve spool 224. Valve spool 224 is shiftable from a leftwardmost position engaging housing 222 to a rightwardmost position engaging stop ring 230 which is seated in the housing 222. A piston 232 is also slidable in housing 222, forming therewith a chamber 234 and extending through chamber 228 and into engagement with the rightward end of spool 224. A spring 236 engages a shoulder 238 formed on piston 232 urging the piston 232 into engagement with piston 224 and in turn urging piston 224 to its full leftward or rest position engaging housing 222. This position of spool 224 corresponds to nonbraking or normal braking of the vehicle when $P_u$ equals $P_g$. When spool 224 is in this rest position, a $P_c$ outlet port 240 connected to modulator chamber 42 by a conduit 242 is communicated to an exhaust orifice 244 so that $P_c$ equals zero. Furthermore, an inlet port 246 connected to transmission pressure conduit 146 is communicated to an outlet port 248. Conduit 250 connects outlet port 248 with the chamber 234 and communicates the resulting switching pressure, hereinafter referred to as $P_s$, to chamber 234 where it acts on piston 232 to provide a leftward acting force on spool 224.

When the driver applies excessive pedal force, brake pressure increases along portion 217 of curve 215 and wheel slip increases so wheel speed and thus $P_g$ decrease faster than vehicle speed and thus $P_u$. At a predetermined pressure differential between $P_u$ and $P_g$, the net rightward acting pressure force on spool 224 overcomes the force of spring 236 and the pressure force of $P_s$ on piston 232, causing spool 224 to move rightwardly. When spool 224 reaches stop ring 230, $P_c$ outlet port 240 communicates with the transmission pressure in conduit 146 through the inlet port 249 and $P_s$ outlet port 248 communicates with exhaust port 252, thereby increasing $P_c$ and exhausting $P_s$. $P_c$ increases rapidly until modulator piston 32 begins to move rightwardly, at which point the rate of change of $P_c$ is controlled by the flow through orifice 254 in conduit 146. Brake pressure decreases along portion 223 of curve 215 as $P_c$ increases. It can be seen that orifice 254 controls the rate of brake pressure release. $P_g$ continues to decrease until the increasing $P_c$ has reduced brake pressure to point 225 on curve 215 where brake torque equals tire torque so that wheel deceleration equals zero. Upon a slight further decrease in brake pressure, brake torque falls below tire torque and the wheel starts accelerating causing $P_g$ to increase. Since the wheel slip is at a value beyond the peak 213 of curve 211, the recovery of wheel speed up to the wheel slip at peak 213 is accompanied by an increase in tire torque. While $P_c$ is increasing, $P_u$ is decreasing at a rate controlled by the decelerometer actuated valve 56. The decelerometer actuated valve 56 is adjusted so that $P_u$ falls slightly below the equivalent vehicle ground speed during the time that $P_b$ is decreasing. $P_c$ continues to increase until the increasing $P_g$ equals the decreasing $P_u$. Then with the pressure forces on spool 224 balanced, spring 236 moves spool 224 leftwardly. During the time that spool 224 is moving to the left, when speed increases to a minimum value of wheel slip where wheel speed is very close to the vehicle ground speed so that the vehicle ground speed computer is reset to a new initial pressure $P_u$ corresponding closely with the true vehicle ground speed. By the end of the wheel speed recovery period, the spool 224 has completed its leftward travel and rests against housing 222. When spool 224 is moved to its full leftward position, $P_s$ increases rapidly and acts through piston 232 to provide a holding force on spool 224 and $P_c$ begins decreasing at a controlled rate through exhaust orifice 244 causing brake pressure to again increase along portion 217 of curve 215 with a consequent reduction in $P_g$ and increase in wheel slip. When the pressure differential between $P_u$ and $P_g$ exceeds exceeds the threshold setting of hysteresis switching valve 220, spool 224 is again moved rightwardly initiating another cycle of the extremal control sequence.

Thus it can be seen that during periods of excessive brake actuation the control system oscillates in a stable limit cycle mode with the hysteresis switching valve 222 periodically cycling $P_c$ from an increasing rate to a decreasing rate, causing wheel slip to continuously oscillate about the peak value 213 of the wheel-to-road friction coefficient.

What is claimed is:

1. A vehicle brake control system effective to vary the wheel speed during high level braking to control wheel slip and comprising:

a master cylinder actuated by the vehicle operator and generating a fluid pressure;

a fluid pressure operated wheel brake receiving master cylinder pressure and adapted to provide a braking torque in proportion thereto;

means providing a fluid pressure proportional to the speed of at least one vehicle wheel;

a vehicle ground speed computer effective to provide a fluid pressure proportional to the vehicle ground speed;

pump means providing a continuous flow of operating fluid;

a modulator interposed fluidly intermediate the master cylinder and the wheel brake and including a check valve blocking flow from the master cylinder to the wheel brake when seated, piston means forming a movable wall in continuous fluid communication with the wheel brake and being engageable with the check valve; spring means normally holding the piston means in unseating engagement with the check valve, and the piston means forming a chamber pressurizable to move the piston means against the spring means to sequentially seat the check valve and then provide a brake pressure proportional to chamber pressure;

anti-lock valve means responsive to the difference between wheel speed proportional pressure and vehicle ground speed proportional pressure and regulating the pressure of the operating fluid to provide a control pressure; and means communicating the control pressure to the modulator chamber whereby the modulator operates to control wheel slip.

2. A vehicle brake control system effective to vary the wheel speed during high level braking to provide a substantially constant ratio of vehicle ground speed to wheel speed and comprising:

a master cylinder actuated by the vehicle operator and generating a fluid pressure;

a fluid pressure operated wheel brake receiving master cylinder pressure and adapted to provide a braking torque in proportion thereto;

means providing a fluid pressure proportional to the speed of at least one vehicle wheel;

a vehicle ground speed computer effective to provide a fluid pressure proportional to the vehicle ground speed;

pump means providing a continuous flow of operating fluid;

a modulator interposed fluidly intermediate the master cylinder and the wheel brake and including a check valve blocking flow from the master cylinder to the wheel brake when seated, piston means forming a movable wall in continuous fluid communication with the wheel brake and being engageable with the check valve, spring means normally holding the piston means in unseating engagement with the check valve, and the piston forming a chamber pressurizable to move the piston means against the spring means to sequentially seat the check valve and then provide a brake pressure proportional to chamber pressure;

servo control valve means providing a control pressure and including, a housing, an operating fluid inlet port, a control pressure outlet port, an exhaust port, a valve spool slidable in the housing to selectively connect the control pressure outlet port with either the operating fluid inlet port or the exhaust port, the valve spool having one end area relatively larger than the other end area, spring means urging the spool to a normal position communicating the control pressure outlet port to the exhaust port, means introducing wheel speed and vehicle ground speed pressures into the housing, the wheel speed pressure acting on the relatively larger end and vehicle ground speed pressure acting on the other end to urge the valve spool to the normal position during normal driving and normal braking, means including an orifice communicating the control pressure to act on the valve spool and thereby provide servo control action to make the control pressure proportional to the differential pressure between wheel speed and vehicle ground speed pressures when excessive master cylinder pressure causes wheel slip, adaptive feedback means including piston means slidable in the housing and operatively engaging the valve spool, and means introducing control pressure to act on the spool through the piston to aid the differential pressure in proportion to the road surface friction coefficient; and conduit means communicating the control pressure to the modulator chamber whereby the modulator operates to provide substantially constant wheel slip during high level braking.

3. A vehicle brake control system effective to vary the wheel speed during high level braking so as to continuously seek the peak value of tire-to-road friction coefficient and comprising:

a master cylinder actuated by the vehicle operator and generating a fluid pressure;

a fluid pressure operated wheel brake receiving master cylinder pressure and adapted to provide a braking torque in proportion thereto;

means providing a fluid pressure proportional to the speed of at least one vehicle wheel;

a vehicle ground speed computer effective to provide a fluid pressure proportional to the vehicle ground speed;

pump means providing a continuous flow of pressurized operating fluid;

a modulator interposed fluidly intermediate the master cylinder and the wheel brake and including a check valve blocking flow from the master cylinder to the wheel brake when seated, piston means forming a movable wall in continuous fluid communication with the wheel brake and being engageable with the check valve; spring means normally holding the piston means in unseating engagement with the check valve, and the piston forming a chamber pressurizable to move the piston means against the spring means to sequentially seat the check valve and then provide a brake pressure proportional to chamber pressure;

servo control valve means providing a control pressure and including, a housing, an operating fluid inlet port, a control pressure outlet port, an exhaust port, a valve spool slidable in the housing to selectively connect the control pressure outlet port with either the operating fluid inlet port or the exhaust port, the valve spool having one end area relatively larger than the other end area, means introducing wheel speed and vehicle ground speed pressures into the housing, the wheel speed pressure acting on the relatively larger end and vehicle ground speed pressure acting on the other end to urge valve spool to a normal position communicating the control pressure outlet port to the exhaust port during normal driving and normal braking, means including an orifice communicating the control pressure to urge the valve spool to provide servo control action to make the control pressure proportional to the differential pressure between wheel speed and vehicle ground speed pressures when excessive master cylinder pressure causes wheel slip, and feedback means including a fluid pressure accumulator formed by piston means slidable in the housing and forming therewith a fluid chamber, and spring means acting between the piston means and the valve spool; and a hysteresis switching valve providing a feedback pressure and including, a housing, an operating fluid inlet port including an orifice, feedback pressure outlet port connected to the accumulator fluid chamber, an exhaust port including an orifice, a valve spool slidable in the housing between a normal position connecting the outlet port with the exhaust port and a second position connecting the outlet port with the inlet port, the valve spool having equal end areas, one end of the spool being stepped with the smaller diameter of the stepped end being sealingly received in the housing when the spool is in the normal position, spring means urging the spool to normal position, means introducing wheel speed and ground speed pressures into the housing, the ground speed pressure acting on only the smaller diameter of the one end when the valve spool is in the normal position and on the entire end area when in the second position, the wheel speed pressure acting on the other end, whereby the spool shifts between the normal and the second position in accordance with the pressure differential between the wheel speed and vehicle speed pressures to cyclically increase and decrease the feedback pressure and generate a force on the spool of the servo control valve causing the control pressure to oscillate in a stable limit cycle mode; and means communicating the control pressure to the modulator chamber whereby the modulator operates to control wheel slip.

4. A vehicle brake control system effective to vary the wheel speed during high level braking so as to continuously seek the peak value of tire-road-friction coefficient and comprising:

a master cylinder actuated by the vehicle operator and generating a fluid pressure;

a fluid pressure operated wheel brake receiving master cylinder pressure and adapted to provide a braking torque in proportion thereto;

means providing a fluid pressure proportional to the speed of at least one vehicle wheel;

a vehicle ground speed computer effective to provide a fluid pressure proportional to the vehicle linear speed;

pump means providing a continuous flow of pressurized operating fluid;

a modulator interposed fluidly intermediate the master cylinder and the wheel brake and including a check valve blocking flow from the master cylinder to the wheel brake when seated, piston means forming a movable wall in continuous fluid communication with the wheel brake and being engageable with the check valve, spring means normally holding the piston means in unseating engagement with the check valve, and the piston forming a chamber pressurizable to move the piston means against the spring means to sequentially seat the check valve and then provide a brake pressure proportional to chamber pressure;

servo control valve means providing a control pressure and including, a housing, first operating fluid inlet port, a second operating fluid inlet port including an orifice, a control pressure outlet port, a switching pressure outlet port, a first exhaust port, a second exhaust port including an orifice, a valve spool slidable in the housing to selectively connect the switching pressure outlet port with either the first operating fluid inlet port or the first exhaust port and the control pressure outlet port with either the second operating fluid inlet port or the second exhaust port, spring means urging the spool to a normal position communicating the switching pressure outlet port to the first inlet port and the control pressure outlet port to the second exhaust port; means introducing wheel speed and vehicle ground speed pressures into the housing to act on opposing ends of the spool, feedback means including piston means slidable in the housing and operatively engaging the valve spool, means introducing the switching pressure into the housing where it acts on the piston means to provide a holding force thereon in aid of the spring means and wheel speed pressure, the valve spool shifting from the normal position at a predetermined differential between wheel speed and ground speed pressures to exhaust switching pressure and increase control pressure, the spool shifting to the normal position when wheel speed pressure substantially equal ground speed pressure to exhaust control pressure and increase switching pressure whereby the control pressure oscillates in a stable limit cycle mode; and means communicating the control pressure to the modulator chamber whereby the modulator operates to control wheel slip.

* * * * *